(12) United States Patent
Zhao et al.

(10) Patent No.: US 11,804,995 B2
(45) Date of Patent: Oct. 31, 2023

(54) DATA SENDING METHOD, TERMINAL DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Zhenshan Zhao, Guangdong (CN); Zuomin Wu, Guangdong (CN); Zhi Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/944,832

(22) Filed: Sep. 14, 2022

(65) Prior Publication Data

US 2023/0015587 A1 Jan. 19, 2023

Related U.S. Application Data

(63) Continuation of application No. PCT/CN2020/080286, filed on Mar. 19, 2020.

(51) Int. Cl.
*H04L 27/26* (2006.01)
*H04W 74/08* (2009.01)

(52) U.S. Cl.
CPC ..... *H04L 27/2605* (2013.01); *H04W 74/0816* (2013.01); *H04W 74/0866* (2013.01)

(58) Field of Classification Search
CPC .......... H04W 74/0816; H04W 74/0866; H04L 27/2605
See application file for complete search history.

(56) References Cited

U.S. PATENT DOCUMENTS

2014/0341018 A1  11/2014  Bhushan et al.
2017/0325225 A1  11/2017  Dinan

FOREIGN PATENT DOCUMENTS

| CN | 106413118 A | 2/2017 |
| CN | 108880768 A | 11/2018 |
| CN | 105721376 B | 6/2019 |
| WO | 2020017939 A1 | 1/2020 |

OTHER PUBLICATIONS

3GPP TSG RAN WG1 #96bis R1-1904587; Xi'an, China, Apr. 8-12, 2019.
3GPP TSG RAN WG1 Meeting #81 R1-153001; Fukuoka, Japan, May 25-29, 2015.

(Continued)

*Primary Examiner* — James P Duffy
(74) *Attorney, Agent, or Firm* — Young Basile Hanlon & MacFarlane, P.C.

(57) ABSTRACT

A data sending method and a terminal device are provided. The data sending method is applied to a terminal device and includes sending placeholder data in a guard period of a slot, an idle duration of the guard period being less than or equal to a target sensing duration. The placeholder data is sent in the guard period of the slot, such that a duration of the guard period may be reduced and a possibility of a transmission resource being preempted by other terminal devices may be reduced, or even avoid the transmission resource being preempted by the other terminal devices.

20 Claims, 4 Drawing Sheets

(56) References Cited

OTHER PUBLICATIONS

3GPP TSG RAN WG1 Meeting #92 R1-1801917; Athens, Greece, Feb. 26-Mar. 2, 2018.
International search report and Written Opinion with English Translation of PCT/CN2020/080286, dated Oct. 16, 2020 (12 pages).
Extended European Search Report for EP Application 20925857.3 dated Mar. 22, 2023. (4 pages).

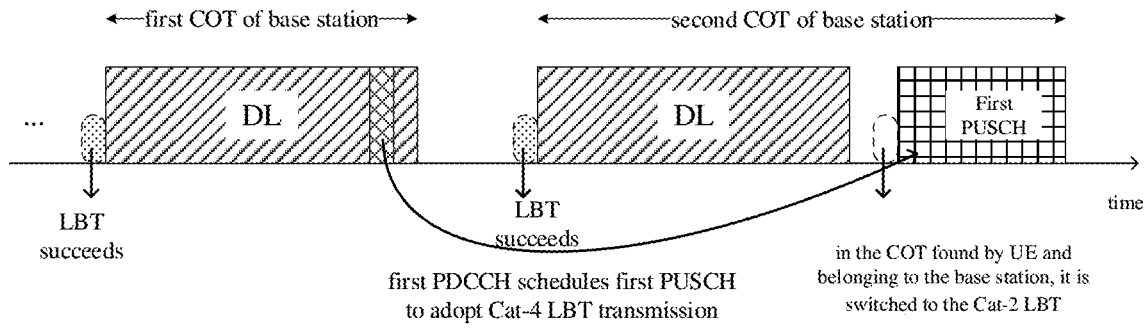
FIG. 4
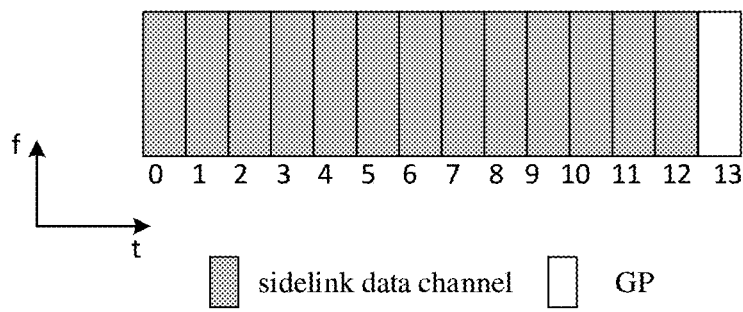
FIG. 5
200
sending placeholder data in a guard period of a slot, an idle duration of the guard interval being less than or equal to a target sensing duration. — S210
FIG. 6
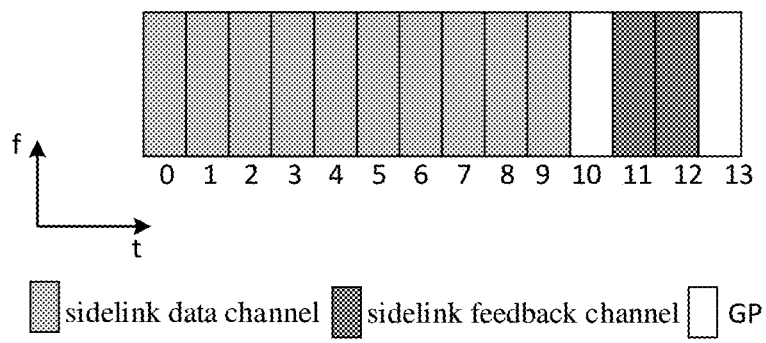
FIG. 7

DATA SENDING METHOD, TERMINAL DEVICE, AND NON-TRANSITORY COMPUTER-READABLE STORAGE MEDIUM

CROSS-REFERENCE TO RELATED APPLICATION(S)

The present application is a continuation of International Patent Application No. PCT/CN 2020/080286 filed on Mar. 19, 2020, the entire contents of which are hereby incorporated by reference.

TECHNICAL FIELD

The present disclosure relates to a field of communications, and in particular to a data sending method, a terminal device, and a non-transitory computer-readable storage medium.

BACKGROUND

A Device to Device (D2D) communication is a transmission technology based on Sidelink (SL). Different from a manner of communication data being received or sent through a base station in a traditional cellular system, a D2D system adopts a direct communication manner of terminal device to terminal device, which thereby has a higher spectral efficiency and a lower transmission delay. In the D2D system, terminal devices sending data at different moments may be different. Guard periods (GPs) may exist among data sent by different terminal devices. When the D2D system and other systems such as a Wireless Fidelity (WiFi) system coexist in an unlicensed spectrum, a D2D terminal is required to determine whether a transmission resource is available by means of Listen Before Talk (LBT). Therefore, the transmission resource of the D2D terminal may be preempted by the other systems during the GPs, such that the D2D terminal may be required to perform the LBT again.

SUMMARY

According to a first aspect of the present disclosure, a data sending method is provided and applied to a terminal device. The method may include sending placeholder data in a guard period of a slot, an idle duration of the guard period being less than or equal to a target sensing duration.

According to a second aspect of the present disclosure, a terminal device is provided and includes a processor and a memory. The memory is configured to store a computer program, and the processor is configured to call and run the computer program stored in the memory and implement the data sending method described above.

According to a third aspect of the present disclosure, a non-transitory computer-readable storage medium is provided and configured to store a computer program, and the computer program causes a computer to implement the data sending method described above.

BRIEF DESCRIPTION OF DRAWINGS

FIG. 4 is a schematic diagram of the base station scheduling the uplink transmission in an LTE-LAA system.

FIG. 5 is an example diagram of a GP.

FIG. 6 is a schematic flowchart of a data sending method according to an embodiment of the present disclosure.

FIG. 7 is another example diagram of GPs.

DETAILED DESCRIPTION

Figure 1:
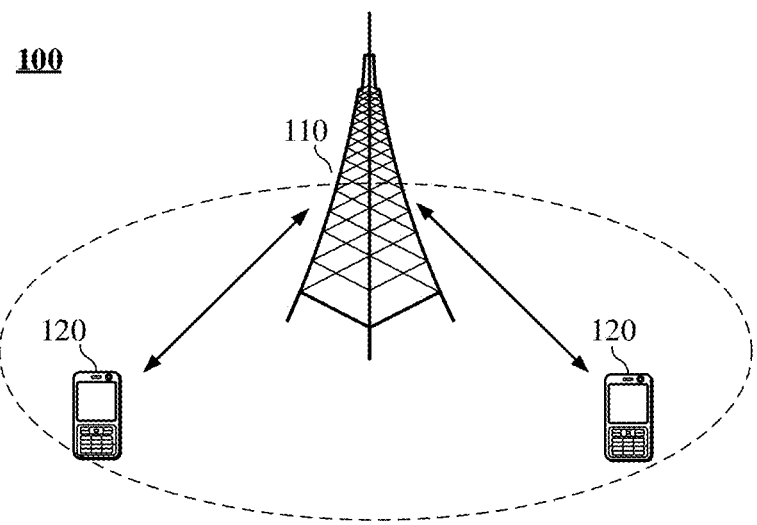
FIG. 1 is a schematic diagram of an application scenario according to some embodiments of the present disclosure.

Technical solutions in the embodiments of the present disclosure will be described in the following with reference to accompanying drawings in the embodiments of the present disclosure.

The technical solutions of the embodiments of the present disclosure may be applied to various communication systems, for example, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of the NR system, a LTE-based access to unlicensed spectrum (LTE-U), a NR-based access to unlicensed spectrum (NR-U) system, a Universal Mobile Telecommunication System (UMTS), a Wireless Local Area Networks (WLAN) system, a WiFi system, a 5th-Generation (5G) system, or other communication systems, etc.

In general, connections supported by a traditional communication system have a limited number and are easy to achieve. However, with a communication technology developing, a mobile communication system may not only support traditional communications, but also support, for example, a Device to Device (D2D) communication, a Machine to Machine (M2M) communication, a Machine Type Communication (MTC), and a Vehicle to Vehicle (V2V) communication, etc. The embodiments of the present disclosure may also be applied to these communication systems.

In some embodiments, the communication system in the embodiments of the present disclosure may be applied to a CA (Carrier Aggregation) scenario, a DC (Dual Connectivity) scenario, or a SA (Standalone) network-deploying scenario.

A spectrum applied is not limited in the embodiments of the present disclosure. For example, the embodiments of the present disclosure may be applied to a licensed spectrum, or be applied to the unlicensed spectrum.

Various embodiments are described in the embodiments of present disclosure in conjunction with a network device and a terminal device. The terminal device may also be referred to as a User Equipment (UE), an access terminal, a user unit, a user station, a mobile station, a mobile platform, a remote station, a remote terminal, a mobile device, a user terminal, a terminal, a wireless communication device, a user agent, or a user device, etc. The terminal device may be a STAION (ST) in the WLAN, a cellular phone, a cordless phone, a Session Initiation Protocol (SIP) phone, a Wireless Local Loop (WLL) station, a Personal Digital Assistant (PDA) device, a handheld device having wireless communication functions, a computing device, or other processing devices connected to a wireless modem, an in-vehicle device, a wearable device, and a next-generation communication system, for example, the terminal device in a NR network or the terminal device in an evolving-in-future Public Land Mobile Network (PLMN).

For an example but not a limitation, in the embodiments of the present disclosure, the terminal device may also be the wearable device. The wearable device may also be referred to as a wearable smart device, which is a general term for the wearable device developed through performing an intelligent design for a daily wear by adopting a wearable technology, such as glasses, gloves, watches, clothing, and shoes. The wearable device is a portable device which is worn directly on a body or integrated into the clothing or accessories of the user. The wearable device is not only a hardware device, but also implement powerful functions through a software support, a data interaction, and a cloud interaction. The wearable smart device in a broad sense may include devices which have complete functions and a large size, and may implement full or a part of the functions without relying on a smart phone, such as smart watches or smart glasses; and devices which may only focus on a certain type of application function and are required to be used cooperating with other devices such as smart phones, for example, all kinds of smart bracelets, smart jewelry, etc. for physical body-sign monitoring.

In the embodiments of the present disclosure, the network device may be a device configured to communicate with the mobile device. The network device may be an AP (Access Point) and the GSM in the WLAN, or a BTS (Base Transceiver Station) in CDMA, or a NodeB (NB) in the WCDMA, or an eNB or eNodeB (Evolutional Node B) in the LTE, or a relay station, or the AP, or the in-vehicle device, the wearable device, and a gNB in the NR network, or the network device in the evolving-in-future PLMN, and the like.

In the embodiments of the present disclosure, the network device may provide services for a cell. The terminal device may communicate with the network device through transmission resources (for example, frequency domain resources, i.e., spectrum resources) used by the cell. The cell may be a cell corresponding to the network device (e.g., the base station). The cell may belong to a macro base station, or belong to a base station corresponding to a small cell. The small cell herein may include a Metro cell, a Micro cell, a Pico cell, a Femto cell, etc. These small cells have such characteristics of a small coverage and a low transmit power that the small cells are suitable for providing a high-speed data-transmission service.

FIG. 1 exemplarily shows a network device 110 and two terminal devices 120. In some embodiments, the communication system 100 may include multiple network devices 110. A covering range of each network device 110 may include other numbers of terminal devices 120, which will not be limited in the embodiments of the present disclosure.

In some embodiments, the communication system 1000 may further include other network entities such as a Mobility Management Entity (MME), an Access and Mobility Management Function (AMF), and the like, which will not be limited in the embodiments of the present disclosure.

It should be understood that the term "system" and the term "network" may be often used interchangeably herein. The term "and/or" herein is simply configured to describe an association relationship of associated objects, indicating three relationships may exist. For example, A and/or B, may mean three cases that A exists alone, A and B exist simultaneously, and B exists alone. In addition, a character "/" herein generally indicates a "or" relationship between an object before the character "/" and a related object behind the character "/".

The unlicensed spectrum is a spectrum allocated by countries and regions and configured to a radio device communication. The spectrum is generally considered to be a shared spectrum. That is, the spectrum may be available to communication devices in different communication systems which meet a regulatory requirement set by the countries or the regions on the spectrum, without applying to a government for an exclusive spectrum license.

In order to allow various communication systems adopting the unlicensed spectrum for the wireless communication to coexist amicably on the spectrum, some countries or regions stipulated regulatory requirements which must be met when the unlicensed spectrum is adopted. For example, the communication device follows a LBT principle, that is, before the communication device transmits a signal on a channel of the unlicensed spectrum, the communication device is required to sense the channel first. Only when a channel sensing result is that the channel is idle, may the communication device send the signal. when the channel sensing result of the communication device on the channel of the unlicensed spectrum is that the channel is busy, the communication device is not allowed to send the signal. In order to ensure fairness, in a transmission, a duration of the communication device transmitting the signal by virtue of the channel of the unlicensed spectrum is not allowed to exceed a maximum channel occupancy time (MCOT).

1. A Transmission Structure in the NR-U System

A signal transmission on the unlicensed spectrum may include the following parameters:

MCOT, may be the maximum time length allowed to transmit the signal by means of the channel of the unlicensed spectrum after the LBT is successful. MCOTs are different in different channel-accessing priorities. Currently, the maximum value of the MCOT is 10 ms. It should be understood that MCOT is a duration occupied by the signal transmission.

COT, may be the time length of transmitting the signal by means of the channel of the unlicensed spectrum after the LBT is successful. The channel occupied by the signal in the time length may be discontinuous. For example, a COT cannot exceed 5 ms at most, and the time length occupied by the signal transmission in the COT does not exceed MCOT.

gNB-initiated COT, i.e. COT of the gNB (such as the base station), may also be known as COT initiated by the network device, or may be the COT obtained after the network device succeeds in the LBT. Within the gNB-initiated COT, not only may a downlink transmission be performed, but also UE may perform an uplink transmission when a certain condition is met.

COT of UE, i.e. UE-initiated COT, may also be known as COT initiated by UE, and may be the COT obtained after UE succeeds in the LBT.

Downlink burst (DL burst), a group of downlink transmissions (that is, including one or more downlink transmissions) performed by the network device. For example, the group of downlink transmissions may be consecutive transmissions (i.e, no gap between multiple downlink transmissions). Or, the gap may exist in the group of downlink transmissions but the gap is less than or equal to 16 µs. When the gap between two downlink transmissions performed by the network device is greater than 16 µs, it may be considered that one of the two downlink transmissions belongs to a DL burst, and the other one of the two downlink transmissions belongs to another DL burst.

Uplink burst (UL burst), a group of uplink transmissions (that is, including one or more uplink transmissions) performed by UE. For example, the group of uplink transmissions may be consecutive transmissions (i.e., no gap exists between multiple uplink transmissions). Or, the gap may exist in the group of uplink transmissions but the gap is less than or equal to 16 µs. When the gap between two uplink transmissions performed by UE is greater than 16 µs, it may be considered that one of the two uplink transmissions belongs to a UL burst, and the other one of the two uplink transmissions belongs to another UL burst.

Figure 2:
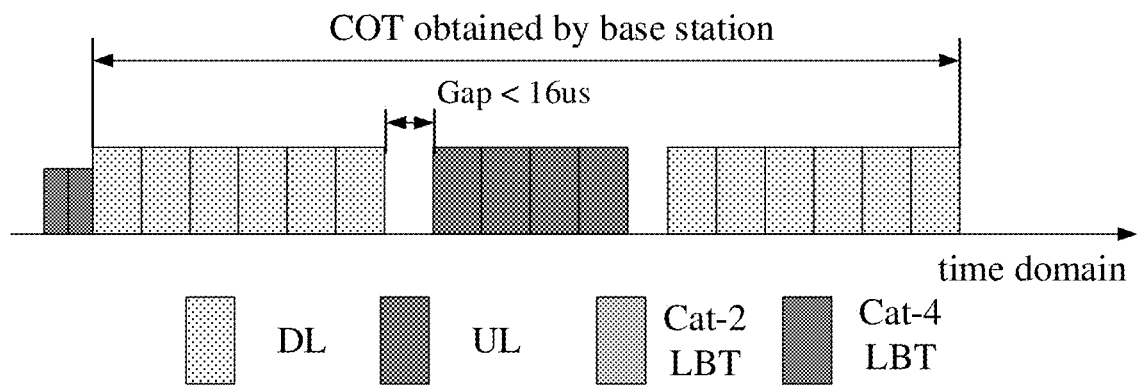
FIG. 2 is a schematic diagram of a base station scheduling an uplink transmission in an NR-U system.
Figure 3:
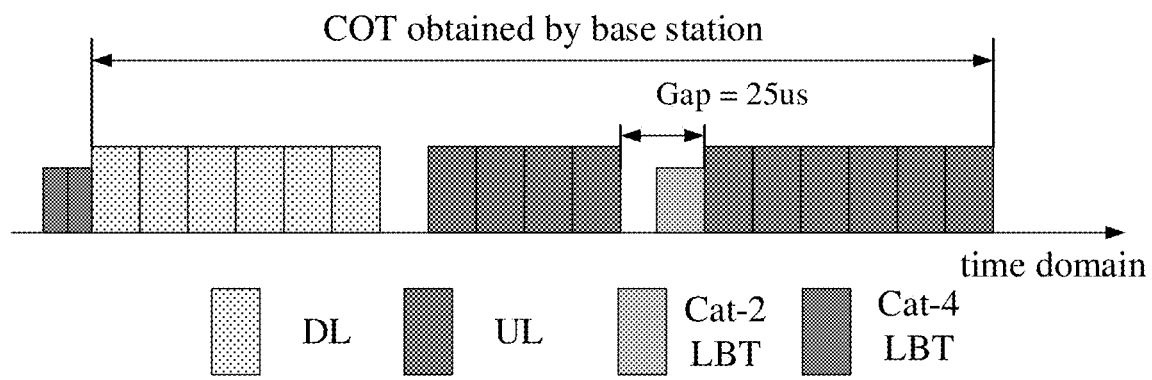
FIG. 3 is another schematic diagram of the base station scheduling the uplink transmission in the NR-U system.

After the network device such as the base station, initiates the COT, the terminal device such as UE may adopt resources in the COT for the uplink transmissions. The UL bursts occur in the COT of the network device may include cases 1-3. Case 1, when a cap between a starting position of the UL burst and an ending position of the DL burst is less than 16 µs, UE may immediately perform the uplink transmissions (or, Category-1 (Cat-1) LBT), as shown in FIG. 2. Case 2, when within the COT of the network device, no DL burst exist after the UL burst, UE may perform a Cat-2 LBT. Case 3, when within the COT of the network device, a gap between any two adjacent transmissions is equal to 16 µs or 25 µs, UE may perform the Cat-2 LBT. For example, as shown in FIG. 3, when the gap is equal to 25 µs, UE may perform the Cat-2 LBT.

In some embodiments, a Cat-1 LBT may refer to the communication device performing the transmission without sensing the channel after an end of the gap. The Cat-2 LBT may refer to the communication device performing a single-slot channel detection. For example, the Cat-2 LBT may include a 25 µs single-slot channel detection and a 16 µs single-slot channel detection. The UL bursts occur in the COT of the network device may include cases 4-5. Case 4, when the cap between the starting position of the UL burst and the ending position of the DL burst is 16 µs, UE may perform the Cat-2 LBT of 16 µs before the uplink transmissions. When the gap between the starting position of the UL burst and the ending position of the DL burst is 25 µs, UE may perform the Cat-2 LBT of 25 µs before the uplink transmissions. The network device may ensure a size of the gap between the starting position of the UL burst and the ending position of the DL burst, and inform size information of the gap or a corresponding LBT manner of the terminal device.

2. An indication of a Channel Access Type (CAT) in the LTE-L AA System

In the LTE-LAA system, when the terminal device is scheduled to perform a Physical Uplink Shared Channel (PUSCH) transmission, the network device may indicate the CAT and a Channel Access Priority Class (CAPC) corresponding to the PUSCH by means of Downlink Control Information (DCI) carrying an Uplink (UL) grant.

For example, the CAT: 1 bit, is configured to indicate a Type 1 CAT or a Type 2 CAT. In some embodiments, the Type 1 CAT may be equivalent to a Cat-4 LBT, and the Type 2 CAT may be equivalent to the Cat-2 LBT of 25 µs. A principle of the network device indicating the CAT is when a to-be-transmitted PUSCH belongs to the COT of the network device, the Cat-2 LBT is indicated, otherwise, and otherwise the Cat-4 LBT is indicated.

CAPC: 2 bits, when the CAT is the Type 1 CAT, the 2 bits are configured to determine corresponding channel access parameters from Table 1 below. Table 1 shows the channel access parameters corresponding to different CAPCs under the Cat-4 LBT. The smaller a value of p, the higher the CAPC.

TABLE 1 channel access parameters corresponding to different CAPCs

| CAPC (p) | $m_p$ | $CW_{min,p}$ | $CW_{max,p}$ | $T_{mcot,p}$ | allowed $CW_p$ value |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

In Table 1 above, $m_p$ refers to the number of back-off slots corresponding to the p, CWp refers to a size of a contention window corresponding to the p, and $CW_{min,p}$ refers to the minimum value of the CWp corresponding to the p, $CW_{max,p}$ refers to the maximum value of the CWp corresponding to the p, and $T_{mcot,p}$ refers to the MCOT length corresponding to the p.

In the COT of the network device, only one UL-DL conversion point is allowed. In addition, when the CAT corresponding to the to-be-transmitted PUSCH of the terminal device is indicated to be the Type 1 CAT, in response to the terminal device receiving public indication information sent by the network device, determining a resource shared by the COT of the network device to the uplink transmissions based on the public indication information, and determining the to-be-transmitted PUSCH belongs to the COT shared by the network device, the terminal device may switch the Type 1 CAT corresponding to the PUSCH to the Type 2 CAT. input type. As shown in FIG. 4, after the LBT is successful, the DL is transmitted in a first COT of the base station, and a first Physical Downlink Control Channel (PDCCH) may schedule a first PUSCH. The first PUSCH is out of the first COT, thus the Cat-4 LBT transmission is adopted. In a gap before the terminal device transmits the first PUSCH, after the base station succeeds in the LBT, a second COT of the base station may transmit the DL. Subsequently, in the COT found by UE and belonging to the base station, it is switched to the Cat-2 LBT to transmit the first PUSCH.

3. Indication of the CAT in the NR-U System

Similar to the LTE-LAA system, in the NR-U system, when the terminal device is scheduled to perform a PUSCH transmission, the network device may also indicate the CAT and the Channel Access Priority Class corresponding to the PUSCH by means of DCI carrying the UL grant.

Different from the LTE-LAA system, in the NR-U system, the CAT required to be indicated may include the Cat-1 LBT, the Cat-2 LBT, and the Cat-4 LBT. The Cat-2 LBT may include the Cat-2 LBT of 25 µs and the Cat-2 LBT of 16 µs. In addition, more than one UL-DL switching points may occur in the COT of the network device in the NR-U system.

In the D2D system, the terminal device sends sidelink data, and other terminal devices surrounding the terminal device may receive the sideline data. At the different moments, the terminal devices sending data may be different. For example, the terminal device sends the data in a first slot, and needs to receive the data sent by other terminal devices in a second slot. Therefore, a last symbol of each slot may be configured as the GP, and no data may be sent in the last symbol. The last symbol may be configured for the terminal device to perform a receiving and transmitting (or transmitting and receiving) conversion.

When the D2D system and the WiFi system coexist in the unlicensed spectrum, the D2D terminal may be also required to determine whether the transmission resource is available by means of the LBT. When it is determined that the transmission resource is available, the D2D terminal may use the transmission resource for T ms continuously. A value of T is related to the CAPC, as shown in Table 1. When the last symbol of the slot of the D2D system is the GP, and no data is transmitted. For example, the slot of the D2D system in FIG. 5 includes symbols 0-13, the sidelink data channels are transmitted in symbols 0-12, which includes a Physical Sidelink Control Channel (PSCCH) and a Physical Sidelink Shared Channel (PSSCH), and the last symbol 13 is the GP. For a subcarrier spacing of 15 kHz, a symbol length may be 71 us. The WiFi terminal may have an opportunity to preempt the transmission resources of the D2D terminal by means of the LBT in the last symbol of each slot, such that the D2D terminal may be required to perform the LBT again.

FIG. 6 is a schematic flowchart of a data sending method 200 according to an embodiment of the present disclosure. The method may be applied to the system as shown in FIG. 1, but not limited thereof. The method may be applied to the terminal device and may include at least a part of the following contents.

At block S210, the method may include sending placeholder data in a guard period of a slot, wherein an idle duration of the guard period is less than or equal to a target sensing duration. The placeholder data is sent in the GP of the slot, such that the duration of the guard period may be reduced and a possibility of the transmission resource being preempted by other terminal devices, or even the transmission resource being preempted by the other terminal devices may be avoided.

In some embodiments, the terminal device may transmit the sidelink data in the slot.

Understandably, the guard period may be the GP in a D2D slot.

In some embodiments, in some embodiments, the guard period may include at least one OFDM symbol. For example, as shown in FIG. 5, the guard period may occupy a last OFDM symbol 13 of a slot, or may also occupy multiple OFDM symbols of the slot.

Further, the guard period may be located at an end of the time slot, or may be located in a middle of the slot. For example, as shown in FIG. 7, UE1 may send the sidelink data to UE2, occupying symbols 0-9. The UE2 may send a sidelink feedback to the UE1, occupying symbols 11-12. Both symbol 10 and symbol 13 are symbols occupied by the GPs, and may be referred to as GP symbols.

In the embodiments of the present disclosure, no terminal device sends data within the idle duration of the guard period. Exemplarily, the idle duration may be equal to a duration of the guard period minus a duration of the placeholder data. The terminal device may first determine the guard period of the slot, and send the placeholder data in the guard period of the slot.

In some embodiments, the duration of the placeholder data may be equal to the duration of the guard period. In this case, the placeholder data may occupy a whole of the guard period, and the idle duration may be 0.

In some embodiments, the placeholder data may include first data before a first symbol corresponding to the sidelink data; and/or the placeholder data may include second data after a last symbol corresponding to the sidelink data. The sidelink data may include a sidelink data channel and a sidelink feedback channel. The sidelink data channel may include the PSCCH and PSSCH. The sidelink feedback channel may include a Physical Sidelink Feedback Channel (PSFCH).

In some embodiments, the terminal device may perform the transmitting and receiving conversion before sending the first data, and perform the receiving and transmitting conversion after sending the second data. For example, before sending the sidelink data, the terminal device may first perform the transmitting and receiving conversion and then sends the first data. The terminal device may perform the receiving and transmitting conversion after sending the second data, and be prepared to receive data of other terminal devices.

In some embodiments, the first data may include specified data. For example, the first data may include an extension of a cyclic prefix (CP) of a first symbol carrying the sidelink data.

In some embodiments, the second data may also include the specified data. For example, the second data may include a part of repeating data of a last symbol carrying the sidelink data.

In some embodiments, the placeholder data may be data generated based on random bits or redundant bits. For example, the first data and/or the second data may be random data generated based on the random bits or the redundant bits.

In some embodiments, the idle duration is the duration of the guard period minus a duration of the first data; and/or a duration of the second data.

When the placeholder data only includes the first data, the idle duration may be the duration of the guard period minus the duration of the first data. When the placeholder data only includes the second data, the idle duration may be the duration of the guard period minus the duration of the second data. When the placeholder data includes the first data and the second data, the idle duration may be the duration of the guard period minus the duration of the first data and the duration of the second data.

In some embodiments, an operation of the sending placeholder data in a guard period of a slot may include sending the first data in a first duration before a starting position of the first symbol corresponding to the sidelink data; and/or sending the second data in a second duration after an ending position of the last symbol corresponding to the sidelink data.

Specifically, when the placeholder data only includes the first data, the terminal device may send the first data in the first duration before the starting position of the first symbol corresponding to the sidelink data. When the placeholder data only includes the second data, the terminal device may send the second data in the second duration after the ending position of the last symbol corresponding to the sidelink data. When the placeholder data includes the first data and the second data, the terminal device may send the first data in the first duration before the starting position of the first symbol corresponding to the sidelink data, and send the second data in the second duration after the ending position of the last symbol corresponding to the sidelink data.

As shown in FIG. 7, the guard period may not in the last symbol of the slot. The UE1 sends the sidelink data to the UE2, occupying symbols 0-9. The UE2 sends the sidelink feedback to the UE1, occupying symbols 11-12. Both the symbol 10 and the symbol 13 are the GP symbols. In this case, the UE1 may send the first data before symbol 0 (the first symbol corresponding to the sidelink data of the UE1), and send the second data after the symbol 9 (the last symbol corresponding to the sidelink data of the UE1). That is, the second data is sent within the symbol 10. The UE2 sends the first data before the symbol 11 (the first symbol corresponding to the sidelink data of the UE2). That is, the first data is sent within the symbol 10. The UE2 sends the second data after the symbol 12 (the last symbol corresponding to the sidelink data of the UE2). That is, the second data is sent within the symbol 13.

In some embodiments, the first duration and/or the second duration is less than or equal to a duration of a half of a symbol For example, when the guard period includes one symbol, both the first duration and the second duration are equal to the duration of the half of the symbol, such that the first duration and the second duration may occupy the whole of the guard period.

For another example, when the guard period includes one symbol, both the first duration and the second duration are less than the duration of the half of the symbol, a duration of the symbol minus the first duration and the second duration, i.e., the idle duration may be less than or equal to the target sensing duration.

In addition, the first duration or the second duration may be greater than the duration of the half of the symbol. For example, the second data sent by the UE1 in a GP symbol (the GP symbol has a duration T_symbol) corresponding to the second duration (T_data2), and T_symbol—T_data2>receiving and transmitting conversion time. For example, the duration of the symbol is 71 us, the T_data2 is 50 us, and the idle duration 21 us is greater than the receiving and transmitting conversion time 20 us. Similarly, the first data sent by the UE2 in advance in the GP symbol correspond to the first duration which may be greater than the duration of the half of the symbol. In this case, the first data sent by the UE1 may overlap with the second data sent by the UE2 in the symbol.

In some embodiments, the first duration and/or the second duration may be determined by at least one manner of network configuration, pre-configuration, and based on the target sensing duration.

In some embodiments, the target sensing duration may be determined based on a length of a minimum time unit of a WiFi device sensing a channel. For example, the target sensing duration may be equal to the length of the minimum time unit of the Wifi device sensing the channel.

For example, the length of the minimum time unit of the WiFi device sensing the channel may be 4 us, when the terminal device sends the placeholder data in the guard period of the slot and cause the idle duration of the guard period being less than 4 us, a WiFi user may not preempt a current transmission resource of the terminal device by means of the LBT.

For another example, the length of the minimum time unit of the WiFi device sensing the channel may be 4 us, when the terminal device sends the placeholder data in the guard period of the slot and cause the idle duration of the guard period being greater than 4 us, for example, the idle duration is 20 us, although it may still be possible for the WiFi user to preempt the current transmission resource of the terminal device by means of the LBT, a possibility of the WiFi user preempting the transmission resource may be reduced relative to a case where the placeholder data does not be sent in the guard period (corresponding to the guard period of 71 us).

In some embodiments, an operation of the sending placeholder data in a guard period of a slot may include delaying a preset duration to send the sidelink data.

In some embodiments, the preset duration may be less than or equal to the duration of the half of the symbol.

In some embodiments, the method may further include delaying the preset duration to send the first data and/or the second data. In this case, it is equivalent that the terminal device delays the preset duration to send the sidelink data and also delays the preset duration to send the placeholder data.

For example, the terminal device may send the first data before the first symbol corresponding to the sidelink data, and the first data corresponds to a length of a half of a time domain symbol. The terminal device may send the second data after the last symbol corresponding to the sidelink data, and the second data corresponds to the length of the half of the time domain symbol. The terminal device may delay a time length corresponding to the half of the time domain symbol to send the first data, the sidelink data, and the second data, such that the first data, the sidelink data, and the second data sent by the terminal device are in the same slot.

In some embodiments, an ending position at which the terminal device sends the second data is a first moment, a starting position at which the corresponding terminal device sends the first data is a second moment, and a duration between the first moment and the second moment is less than or equal to the target sensing duration.

For example, the UE1 sending the second data in the guard period ending at a moment t1, and the UE2 sending the first data starts at a moment t2 in the guard period. When t1 is before t2, a duration between t1 and t2 may be less than or equal to the target sensing duration. When t1 is after t2, that is, the data sent by UE1 and the data sent by the UE2 have an overlap in time domain within the guard period, a possibility of the Wifi user accessing the channel may be reduced.

Example 1

Terminal devices may send the data in advance and/or delay sending the data, such that the data sent among the terminal devices may occupy a whole of the slot, so as to reduce a possibility of the Wifi device accessing the system. The present embodiment may include the following features.

Feature 1, each terminal device may send the data in advance of a certain duration such as the time length of the half of the symbol.

Feature 2, the each terminal device may send the data in a certain duration of the GP symbol of the sidelink data, for example, the GP symbol may be the last symbol of the slot, or the certain duration may be a time length of a first half of the symbol.

Figure 8:
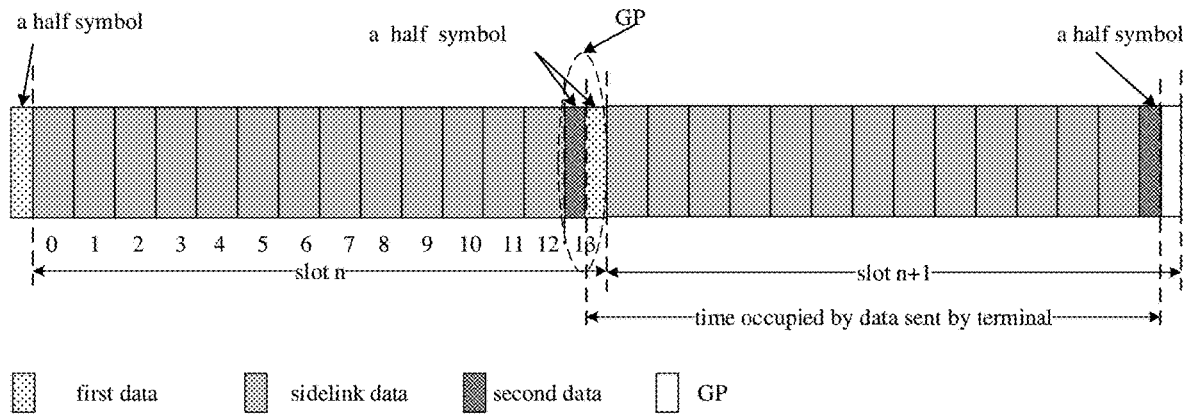
FIG. 8 is an exemplary diagram of the GPs including placeholder data.

For example, as shown in FIG. 8, a terminal 1 may send the sidelink data in a slot n, and a terminal 2 may send the sidelink data in a slot n+1. The sidelink data may occupy the symbols 0-12. A last symbol 13 after the slot n and the slot n+1 is the GP. The terminal 1 may start sending the first data (e.g., the extension of the CP of the symbol 0) from a half symbol (in the GP symbol of a previous slot), and send the second data (e.g., the random data generated based on the random bits) in a first half of the symbol 13 of the slot n, and perform the receiving and transmitting conversion in a second half of the symbol 13 of the slot n. A terminal 2 may perform the receiving and transmitting conversion in the first half of the symbol 13 of the slot n, and send the first data in the second half of the symbol 13 of the slot n. The terminal 2 may send the second data (e.g., the random data generated based on the random bits) in the first half of the symbol 13 of the slot n+1, and perform the receiving and transmitting conversion in the second half of the symbol 13 of the slot n+1. In this way, the second data of the terminal 1 and the first data of the terminal 2 may occupy an entire time domain resource in the symbol 13 of the slot n, that is, no transmission period may exist therein, such that the WiFi device may have no opportunity to access the system.

In some embodiments, the terminal 1 may transmit the second data having a duration T1 at a starting position of the GP symbol of the slot n, and the terminal 2 may send the first data in advance of a duration T2 in the GP symbol. The duration of the GP symbol may include one or more symbols, indicated by T_GP. T_GP-T1-T2<=T_LBT_unit may be satisfied, and the T_LBT_unit may indicate the time length determined based on the length of the minimum time unit of the WiFi user sensing the channel. Based on the above format, when T_GP-T1-T2<T_LBT_unit, the WiFi device has no oppotunity to access the system. When T_GP-T1-T2=T_LBT, the possibility of the WiFi device accessing the system may be significantly reduced.

In some embodiments, the data sent by the terminal device in the GP symbol may be generated based on the random bits or the redundant bits. In some embodiments, in the GP symbol, after sending the sidelink data, the terminal 1 may send the part of the repeating data of the last symbol. Before sending the sidelink data, the terminal 2 may send the extension of the CP of the first symbol.

In addition, for a same terminal device, the terminal device may send the first data in the GP before sending the sidelink data, and send the second data in the GP after sending the sidelink data. For example, the terminal 1 may send the first data first, send the sidelink data in the symbols 0-12 of the slot n, and send the second data in the symbol 13 of the slot n. Similarly, the terminal 2 may send the first data in the symbol 13 of the slot n, send the sidelink data in the symbols 0-12 of the slot n+1, and send the second data in the symbol 13 of the slot n+1.

Example 2

The terminal device may delay the time length of the half of the symbol to send sidelink data on other symbols than the GP symbol in the slot, send the placeholder data in a first half of the first symbol, and send the placeholder data in a second half of the last symbol.

Figure 9:
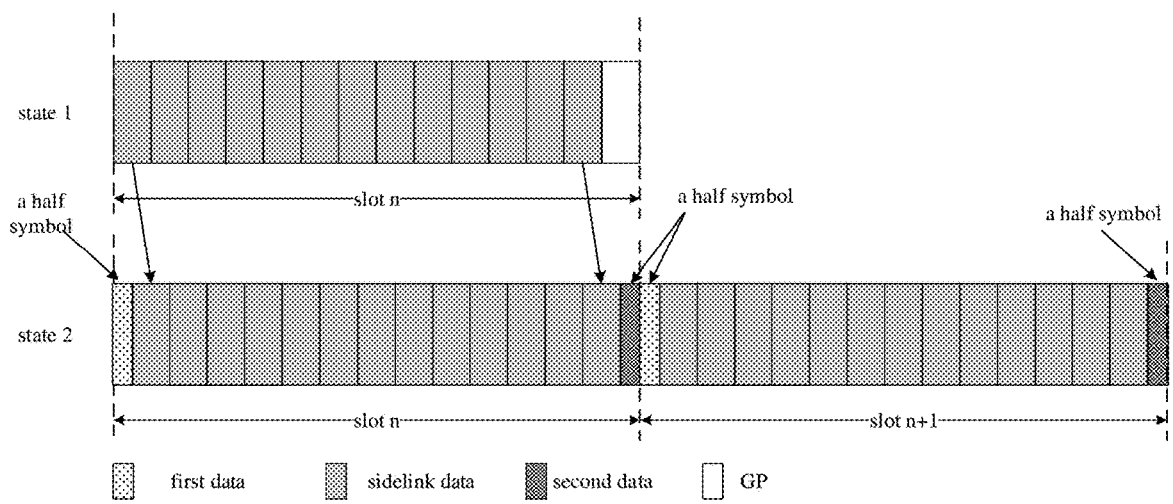
FIG. 9 is another exemplary diagram of the GPs including the placeholder data.

As shown in FIG. 9, in a slot structure in the related art, under a state 1, the terminal device may not send the data when the last symbol is the GP symbol. In the embodiments of the present disclosure, under a state 2, the data of the terminal device may be delayed the time length of the half of the symbol to be sent. The placeholder data such as the random data may be sent in a first half symbol of the slot, the placeholder data such as the random data may be sent in a half symbol before an end of the slot, such that the data sent by the D2D terminal occupy the whole of the slot and the possibility of the WiFi device accessing the system may be reduced.

In some embodiments, the terminal device may send the data in the slot n (including the random data), perform the receiving and transmitting conversion in a first half symbol of the slot n+1. Since the first half symbol is the random data sent by other terminals, the terminal has no need to receive the random data, such that the time length of the first half symbol may be configured to perform the receiving and transmitting conversion and useful data sent by other terminal devices may be received after a half symbol of the slot n+1.

In some embodiments, the terminal 1 may transmit the data having the duration T1 at the starting position of the GP symbol, and the terminal 2 may send the data in advance of the duration T2. The duration of the GP symbol may include one or more symbols, indicated by the T_GP. T_GP-T1-T2<=T_LBT_unit may be satisfied, and the T_LBT_unit may indicate the time length determined based on the length of the minimum time unit of the WiFi user sensing the channel. Based on the above format, when T_GP-T1-T2<T_LBT_unit, the WiFi device has no oppotunity to access the system. When T_GP-T1-T2=T_LBT, the possibility of the WiFi device accessing the system may be significantly reduced.

In some embodiments, the data sent by the terminal device in the GP symbol may be generated based on the random bits or the redundant bits. In some embodiments, in the GP symbol, after sending the sidelink data, the terminal 1 may send the part of the repeating data of the last symbol. Before sending the sidelink data, the terminal 2 may send the extension of the CP of the first symbol.

Figure 10:
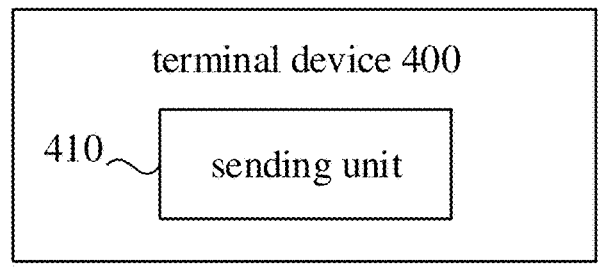
FIG. 10 is a schematic block diagram of a terminal device according to an embodiment of the present disclosure.

FIG. 10 is a schematic block diagram of a terminal device 400 according to an embodiment of the present disclosure. The terminal device 400 may include a sending unit 410.

The sending unit 410 may be configured to send placeholder data in a guard period of a slot, an idle duration of the guard period being less than or equal to a target sensing duration.

In some embodiments, a duration of the placeholder data may be equal to a duration of the guard period.

In some embodiments, the placeholder data may include first data before a first symbol corresponding to sidelink data; and/or the placeholder data may include second data after a last symbol corresponding to the sidelink data.

In some embodiments, the idle duration may be the duration of the guard period minus a duration of the first data; and/or a duration of the second data.

In some embodiments, the sending unit 410 is specifically configured to send the first data in a first duration before a starting position of the first symbol corresponding to the sidelink data; and/or send the second data in a second duration after an ending position of the last symbol corresponding to the sidelink data.

In some embodiments, the first duration and/or the second duration may be less than or equal to a duration of a half of a symbol.

In some embodiments, the first duration and/or the second duration may be determined by at least one manner of network configuration, pre-configuration, and based on the target sensing duration.

In some embodiments, the sending unit 410 may be specifically configured to delay a preset duration to send the sidelink data.

In some embodiments, the preset duration may be less than or equal to a duration of a half of a symbol.

In some embodiments, the sending unit 410 may be further configured to delay the preset duration to send the first data and/or the second data.

In some embodiments, the guard period between the terminal device and an corresponding terminal device may include the second data of the terminal device and the first data of the corresponding terminal device.

In some embodiments, an ending position at which the terminal device sends the second data may be a first moment, a starting position at which the corresponding terminal device sends the first data may be a second moment, and a duration between the first moment and the second moment may be less than or equal to the target sensing duration.

In some embodiments, the first data may include an extension of a CP of a first symbol of the slot; and/or the second data may include a part of repeating data of a last symbol of the slot.

In some embodiments, the placeholder data may be data generated based on random bits or redundant bits.

In some embodiments, the guard period may include at least one OFDM symbol.

In some embodiments, the target sensing duration may be determined based on a length of a minimum time unit of a WiFi device sensing a channel.

It should be understood that the above and other operations and/or functions of each unit in the terminal device according to the embodiments of the present disclosure are respectively configured to implement corresponding processes of the terminal device in the method 200 in FIG. 6, which are not repeated herein for concision.

Figure 11:
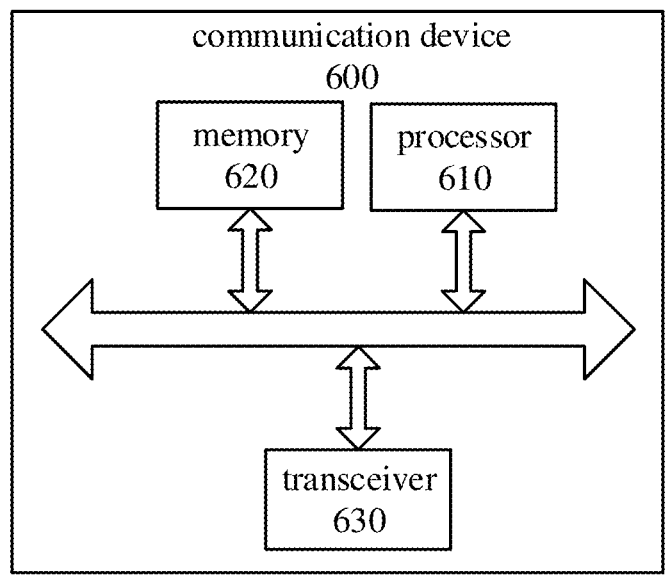
FIG. 11 is a schematic block diagram of a communication device according to some embodiments of the present disclosure.

FIG. 11 is a schematic block diagram of a communication device 600 according to some embodiments of the present disclosure. The communication device 600 shown in FIG. 11 may include a processor 610. The processor 610 may be configured to call a computer program from a memory and run the computer program to implement the method according to the embodiments of the present disclosure.

In some embodiments, as shown in FIG. 11, the communication device 600 may further include the memory 620. The processor 610 may be configured to call the computer program from the memory 620 and run the computer program to implement the method according to the embodiments of the present disclosure.

In some embodiments, the memory 620 may be a separate device independent of the processor 610, or may be integrated in the processor 610.

In some embodiments, the communication device 600 may further include a transceiver 630. The processor 610 may be configured to control the transceiver 630 to communicate with other devices. Specifically, the processor 610 may be configured to control the transceiver 1030 to send information or data to other devices, or receive information or data sent by the other devices.

In some embodiments, the transceiver 630 may include a transmitter and a receiver. The transceiver 630 may further include antennas, and the number of the antennas may be one or more.

In some embodiments, the communication device 600 may be the network device in the embodiments of the present disclosure and may implement a corresponding process implemented by the network device in each method in the embodiments of the present disclosure, which is not repeated herein for concision.

In some embodiments, the communication device 600 may be the terminal device in the embodiments of the present disclosure and may implement a corresponding process implemented by the terminal device in each method of the embodiments of the present disclosure, which is not repeated herein for concision.

Figure 12:
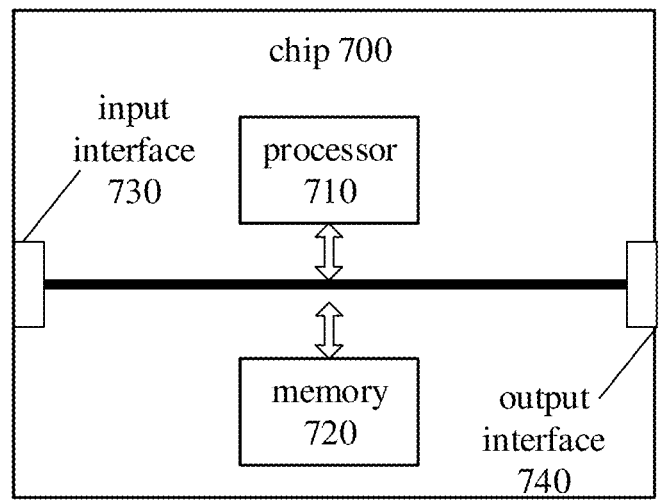
FIG. 12 is a schematic block diagram of a chip according to some embodiments of the present disclosure.

FIG. 12 is a schematic block diagram of a chip 700 according to some embodiments of the present disclosure. The chip 700 as shown in FIG. 12 may include a processor 710. The processor 710 may call a computer program from a memory and run the computer program to implement the method in the embodiments of the present disclosure.

In some embodiments, as shown in FIG. 12, the chip 700 may further include the memory 720. The processor 710 may call the computer program from the memory 720 and un the computer program to implement the method in the embodiments of the present disclosure.

The memory 720 may be a separate device independent of the processor 710, or may be integrated in the processor 710.

In some embodiments, the chip 700 may further include an input interface 730. The processor 710 may control the input interface 730 to communicate with other devices or chips. Specifically, the processor 710 may control the input interface 730 to acquire information or data sent by other devices or chips.

In some embodiments, the chip 700 may further include an output interface 740. The processor 710 may be configured to control the output interface 740 to communicate with the other devices or chips. Specifically, the processor 710 may be configured to control the output interface 740 to output information or data to the other devices or chips.

In some embodiments, the chip may be applied to the network device in the embodiments of the present disclosure, and implement the corresponding process implemented by the network device in each method of the embodiments of the present disclosure, which is not repeated herein for concision.

In some embodiments, the chip may be applied to the terminal device in the embodiments of the present disclosure, and implement the corresponding process implemented by the terminal device in each method of the embodiments of the present disclosure, which is not repeated herein for concision.

It should be understood that the chip described in the embodiments of the present disclosure may also be referred to as a system-on-chip, a system chip, a chip system, or system-on-chip chip, or the like.

The processor described above may be a general-purpose processor, a digital signal processor (DSP), a field programmable gate array (FPGA), an application specific integrated circuit (ASIC) or other programmable logic devices, a transistor logic device, a discrete hardware component, etc. The general-purpose processor described above may be a microprocessor or any conventional processor, or the like.

The memory described above may be either a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically EPROM (EEPROM), or a flash memory. The volatile memory may be a random access memory (RAM).

It should be understood that above memories are exemplary but not limitative descriptions. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM), and a Direct Rambus RAM (DR RAM), and so on. That is, the memory in the embodiments of the present disclosure may be intended to include but not limited to these and any other suitable types of memories.

Figure 13:
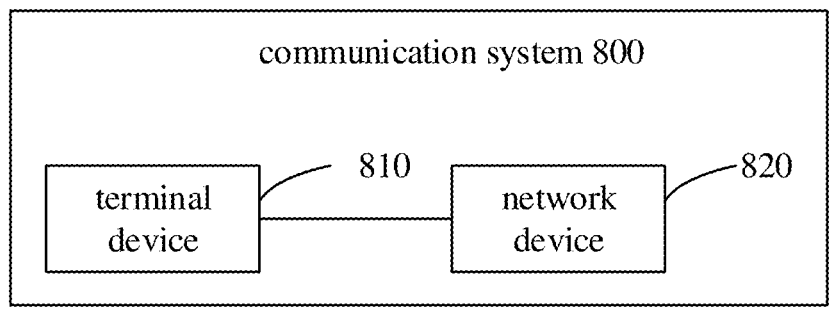
FIG. 13 is a schematic block diagram of a communication system according to some embodiments of the present disclosure.

FIG. 13 is a schematic block diagram of a communication system 800 according to some embodiments of the present disclosure. As shown in FIG. 13, the communication system 800 may include a terminal device 810 and a network device 820.

In some embodiments, the terminal device 810 may be configured to implement the corresponding functions implemented by the terminal device in the method described above, and the network device 820 may be configured to implement the corresponding functions implemented by the network device in the method described above. A repeated description will not be made herein for concision.

In the above embodiments, it may be implemented in whole or in part by a software, a hardware, a firmware, or any combination thereof. When implemented by the software, it may be implemented in whole or in part in a form of a computer program product. The computer program product may include one or more computer indications. When the computer program indications are loaded and executed on a computer, all or part of the processes or functions described in the embodiments of the present disclosure may be generated. The computer may be a general purpose computer, a special purpose computer, a computer network, or other programmable devices. The computer indications may be stored in a computer readable storage medium, or be transmitted from the computer readable storage medium to another computer readable storage medium. For example, the computer indications may be transmitted from a website site, a computer, a server, or a data center by wire (e.g., a coaxial cable, an optical fiber, a Digital User Line (DSL)) or wireless (e.g., infrared, wireless, microwave, etc.) to another website site, another computer, another server, or another data center. The computer-readable storage medium may be any available medium that may be accessed by the computer, or a data storage device such as a server, a data center, etc. including one or more available media integrated. The available media may be magnetic media (e.g., floppy disks, hard disks, magnetic tapes), optical media (e.g., DVD), or semiconductor media (e.g., Solid State Disk (SSD)), and the like.

It should be understood that, in various embodiments of the present disclosure, a size of a sequence numbers of the above process does not mean an executing sequence. The executing sequence of each process should be determined based on its function and internal logic, and should be not understood as any limitation to an implementation process in the embodiments of the present disclosure.

Those skilled in the art may clearly understand that, for the convenience and brevity of description, a specific operating process of the above system, device, and unit may refer to a corresponding process in the above method embodiments, which will not be repeated herein.

A protection scope of the present disclosure is not limited to the above descriptions which are only specific embodiments of the present disclosure. Any change or substitution easily obtained by a person skilled in the art who is familiar with the present technical field should be covered within the protection scope of the present disclosure. Therefore, the protection scope of the present disclosure shall be subject to a protection scope of the claims.

What is claimed is:

1. A data sending method, applied to a terminal device, and comprising:
   sending placeholder data in a guard period of a slot, wherein an idle duration of the guard period is less than or equal to a target sensing duration.

2. The method according to claim 1, wherein a duration of the placeholder data is equal to a duration of the guard period.

3. The method according to claim 1, wherein the placeholder data comprises first data before a first symbol corresponding to sidelink data; and/or the placeholder data comprises second data after a last symbol corresponding to the sidelink data.

4. The method according to claim 3, wherein the idle duration is the duration of the guard period minus a duration of the first data; and/or a duration of the second data.

5. The method according to claim 3, wherein the sending placeholder data in the guard period of a slot, comprises:
   sending the first data in a first duration before a starting position of the first symbol corresponding to the sidelink data; and/or
   sending the second data in a second duration after an ending position of the last symbol corresponding to the sidelink data.

6. The method according to claim 5, wherein the first duration and/or the second duration is less than or equal to a duration of a half of a symbol.

7. The method according to claim 5, wherein the first duration and/or the second duration are determined by at least one manner of:
   network configuration;
   pre-configuration; or
   based on the target sensing duration.

8. The method according to claim 3, wherein the sending placeholder data in the guard period of a slot, comprises:
   delaying a preset duration to send the sidelink data.

9. The method according to claim 8, wherein the preset duration is less than or equal to a duration of a half of a symbol.

10. The method according to claim 8, further comprising:
    delaying the preset duration to send the first data and/or the second data.

11. The method according to claim 3, wherein the guard period between the terminal device and a corresponding terminal device comprises the second data of the terminal device and the first data of the corresponding terminal device.

12. The method according to claim 11, wherein an ending position at which the terminal device sends the second data is a first moment, a starting position at which the corresponding terminal device sends the first data is a second moment, and a duration between the first moment and the second moment is less than or equal to the target sensing duration.

13. The method according to claim 3, wherein the first data comprises an extension of a cyclic prefix (CP) of a first symbol of the slot; and/or
    the second data comprises a part of repeating data of a last symbol of the slot.

14. The method according to claim 1, wherein the placeholder data is data generated based on random bits or redundant bits.

15. The method according to claim 1, wherein the guard period comprises at least one OFDM symbol.

16. The method according to claim 1, wherein the target sensing duration is determined based on a length of a minimum time unit of a wireless fidelity (Wifi) device sensing a channel.

17. A terminal device, comprising:
    a processor; and
    a memory, configured to store a computer program;
    wherein the processor is configured to call and run the computer program stored in the memory, and implement:
    sending placeholder data in a guard period of a slot, wherein an idle duration of the guard period is less than or equal to a target sensing duration.

18. The terminal device according to claim 17, wherein a duration of the placeholder data is equal to a duration of the guard period.

19. The terminal device according to claim 18, wherein the placeholder data comprises first data before a first symbol corresponding to sidelink data; and/or the placeholder data comprises second data after a last symbol corresponding to the sidelink data.

20. A non-transitory computer-readable storage medium, configured to store a computer program, wherein the computer program causes a computer to implement:
    sending placeholder data in a guard period of a slot, wherein an idle duration of the guard period is less than or equal to a target sensing duration.

* * * * *